US006847877B2

(12) United States Patent
Homeyer

(10) Patent No.: US 6,847,877 B2
(45) Date of Patent: Jan. 25, 2005

(54) METHOD AND ARRANGEMENT FOR CONTROLLING A DRIVE UNIT

(75) Inventor: Manfred Homeyer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 10/259,901

(22) Filed: Sep. 30, 2002

(65) Prior Publication Data

US 2003/0065433 A1 Apr. 3, 2003

(30) Foreign Application Priority Data

Sep. 29, 2001 (DE) ........................................ 101 48 344

(51) Int. Cl.[7] ........................ B60K 41/10; B60K 41/28; B60K 13/02

(52) U.S. Cl. ........................... 701/51; 701/93; 180/170

(58) Field of Search ..................... 701/51, 93; 180/170; 123/90.15; 477/79, 173, 71, 901, 62, 110, 107

(56) References Cited

U.S. PATENT DOCUMENTS

| | | | | | |
|---|---|---|---|---|---|
| 5,400,865 | A | * | 3/1995 | Togai et al. | 180/197 |
| 5,496,227 | A | * | 3/1996 | Minowa et al. | 477/62 |
| 5,692,990 | A | * | 12/1997 | Tsukamoto et al. | 477/93 |
| 6,098,592 | A | | 8/2000 | Hess et al. | 123/350 |
| 6,336,441 | B1 | * | 1/2002 | Russell et al. | 123/442 |
| 6,358,186 | B1 | * | 3/2002 | Kosik et al. | 477/176 |

FOREIGN PATENT DOCUMENTS

DE 197 54 286 6/1999

* cited by examiner

*Primary Examiner*—Tan Q. Nguyen
*Assistant Examiner*—Dalena Tran
(74) *Attorney, Agent, or Firm*—Walter Ottesen

(57) ABSTRACT

A method for controlling a drive unit of a vehicle includes forming a desired value for the torque of the drive unit in dependence upon the driver command. The formation of the desired value takes place in different ranges of the driver command with different weighting of the load dependency. The desired value in the mid range is independent of different loads of the drive unit.

6 Claims, 4 Drawing Sheets

METHOD AND ARRANGEMENT FOR CONTROLLING A DRIVE UNIT

FIELD OF THE INVENTION

The invention relates to a method and an arrangement for controlling a drive unit of a motor vehicle. The invention also relates to a computer program for controlling a drive unit of a vehicle.

BACKGROUND OF THE INVENTION

From German patent publication 196 19 324, it is known to adjust the torque of the drive unit in dependence upon the position of an operator-controlled element actuated by the driver. A driver command torque is formed on the basis of this position and the torque of the drive unit is controlled in dependence upon this driver command torque in the sense of approaching the driver command torque. For determining the driver command torque, a first and a second torque are formed. The first torque is the maximum torque attainable at the particular operating point and the second torque is the minimum torque considering the loads on the drive unit. The driver command torque is then computed from a value, which is derived from the position of the operator-controlled element, via interpolation between these changeable maximum and minimum torque values. With the known solution, a satisfactory compensation of the loads in the driver command torque is obtained.

A procedure for determining a driver command torque is known from published German patent application 197 54 286. Here, the accelerator pedal position range is subdivided into two ranges. In a lower accelerator pedal range, the driver command is so computed that the torque development at the clutch is independent of ambient influences such as elevation above sea level, intake air temperature, et cetera and ancillary loads, operation of the climate system, generator, engine losses and transmission losses (that is, full compensation of the loads). In an upper accelerator pedal range, the computation is carried out in such a manner that a continuous metering of torque is achieved, that is, a change of the accelerator pedal position has the consequence of a torque change also in this range.

If a torque occurring at the output end of the transmission is pregiven as a driver command torque rather than an indicated engine torque as in the state of the art, then the possibility is presented to permit a targeted influencing of the torque by the driver in the drag range of the engine. This torque occurring at the output end of the transmission can, for example, be the transmission output torque, wheel torque, et cetera. The known solutions for determining the driver command do not provide any solution for the above.

SUMMARY OF THE INVENTION

The method of the invention is for controlling a drive unit of a vehicle wherein a driver command is determined from the degree of actuation of an operator-controlled element actuable by the driver, and wherein a desired value for the torque of the drive unit is formed from the driver command and the torque of the drive unit is controlled in dependence upon the desired value, the driver command being subdivided into first, second and third ranges. The method includes the steps of: causing the first range to include a zero value of the driver command and forming the desired value for the torque of the drive unit in the first range from the driver command value while considering changing ancillary loads of the drive unit; forming the desired value for the torque of the drive unit from the driver command value in the second range independently of changing ancillary loads of the drive unit; and, causing the third range to include a maximum value of the driver command and forming the desired value for the torque of the drive unit from the driver command value in the third range while again considering the changing ancillary loads of the drive unit.

A targeted influencing of the torque in the drag range of the engine by the driver is made possible by a third range of the accelerator pedal position wherein a driver command torque is computed while considering changing loads. In an advantageous manner, the determination of the driver command torque is optimized for the use in control systems wherein a torque at the output end of the transmission is pregiven by the driver.

Special advantages are present in combination with hybrid vehicles because the possibility of the brake recuperation is considered by the determination of the driver command torque.

In an especially advantageous manner, the adjustment of the torque, which is wanted by the driver, in a mid accelerator pedal range is independent of the changing ancillary loads. In the lower and upper accelerator pedal ranges, however, the driving torque is dependent upon load and can be well metered by the driver. For this reason, the described procedure makes possible a good metering of fuel (no dead travel) in the lower accelerator pedal range even for large changing drag torques such as in the recuperation of a starter generator.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
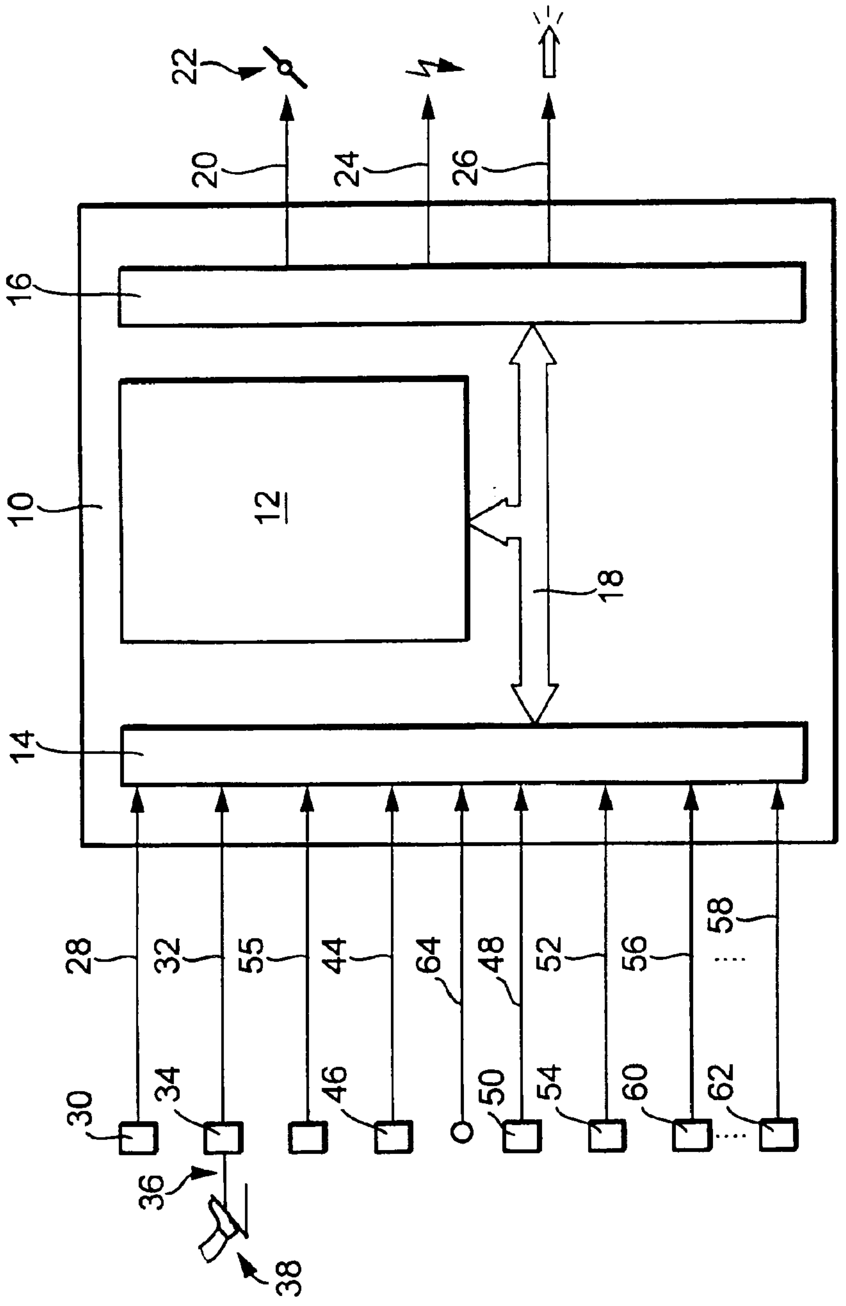
FIG. 1 shows a control arrangement for controlling a drive unit of a vehicle.

FIG. 1 shows an electronic control unit 10, which includes at least a microcomputer 12 as well as input circuits 14 and output circuits 16. The input circuits 14, the microcomputer 12 and the output circuits 16 are connected by a communications system 18 for the mutual exchange of data and information. Various input lines from various measuring devices, operator-controlled elements, et cetera are connected to the input circuit 14. Output lines are connected to the output circuit 16 of the control unit 10 and the power parameters of the drive unit are influenced via these output lines. In the preferred embodiment, the drive unit is an internal combustion engine. A first output line 20 therefore leads to an electrically actuable throttle flap 22 for influencing the air supply to the engine. The control unit 10 influences at least the ignition time point and the fuel metering of the engine via additional output lines 24 and 26. A first input line 28 connects the control unit 10 to a measuring device 30 for detecting the engine rpm. An input line 32 leads from a measuring device 34 to the control unit 10. The measuring device 34 is connected via a mechanical connection 36 to an operator-controlled element 38 such as an accelerator pedal. An input line 44 connects the control unit 10 to a measuring device 46 for detecting the atmospheric pressure, that is, the pressure in the intake manifold of the engine forward of the throttle flap. The atmospheric pressure can be determined in another embodiment also by means of an adaptation. An input line 48 connects the control unit 10 to a measuring device 50 for detecting the intake manifold air temperature, that is, the temperature of the air forward of the throttle flap. A further input line 52 connects the control unit 10 to a measuring device 54 for detecting the engine load, for example, an air mass sensor, an air quantity sensor, a throttle flap position sensor or an intake manifold pressure measuring device. Via a further input line 55, the control unit 10 is supplied with at least information as to the current operating state or the current torque requirement of ancillary consumers such as a climate control system, power steering, a generator, et cetera. Additional input lines 56 to 58 connect the control unit 10 to measuring devices 60 to 62 which detect additional operating variables of the engine and/or of the vehicle such as vehicle speed, engine temperature, exhaust-gas composition, battery voltage, et cetera.

The solution according to the invention is described in the following in connection with a spark-ignition engine having $\lambda=1$ operation (power setting via throttle flap input). This solution can, however, also be applied with corresponding advantages to spark-ignition engines having lean operation (for example, gasoline-direct injection with power setting via fuel input), diesel engines or, for alternative drive concepts, for example, electric motors.

The electronic control unit 10 or, more specifically, the microcomputer 12 forms a so-called driver command torque on the basis of the degree of actuation of the operator-controlled element 38 in the manner described hereinafter. This driver command torque is adjusted as a desired value for an output torque of the drive unit (clutch torque, transmission output torque) in a manner known per se via control of the power parameters of the drive unit. For computing the driver command torque from the driver command signal (accelerator pedal position signal), three driver command ranges are provided which are described by three equations, preferably linear equations. The basic type of these linear equations can be written as follows:

$$mfa=s*F+b$$

wherein: mfa is the driver command torque, s is the slope of the line, F is the relative driver command which is derived from the accelerator pedal position (if needed, while considering vehicle speed or engine rpm), b is an axis segment. The slope and axis segment are pregiven depending upon the accelerator pedal position range (upper, middle, lower).

For the mid driver command range, an equation is pregiven wherein the minimum load of the engine is always considered as a constant. For this reason, the slope $S_m$ and axis segment $b_m$ are pregiven as fixed values for the mid range:

$$mfa_m=S_m*F+b_m.$$

In the upper accelerator pedal position range, that is, in the range of large driver command values (for example, full-load range), it is desirable to achieve a good meterability of the engine torque by the driver, that is, each change of the accelerator pedal position causes a change of the engine torque in this range. For this reason, slope and axis segment are computed as in the state of the art. In this range, a linear equation as set forth below results for the evaluation of the driver command and the formation of the driver command torque:

$$\mathrm{mfa}_o=S_o*F+(1-S_o)*K*(U-L)$$

$$\text{wherein: } S_o=(U-L)(1-K)/(1-(U-L)*K).$$

In the above, L is a load factor in which all loads, losses, heating power, torque requests are considered which do not contribute to propulsion. In the simplest example, the load factor L represents the sum of all torques which are not propulsion relevant. In the preferred embodiment, this load factor is referred to the maximum torque and changes between the limit values 0 and 1. The load factor thereby defines an index for the changing load of the engine.

The factor K is a pregivable applicable quantity and can, if needed, be dependent upon the vehicle speed, rpm, elevation above sea level, the set gear, et cetera. The factor K is also changeable between the limit values 0 and 1. In one embodiment, it is fixed with factor K as to how many percent of the instantaneous maximum possible torque are metered constantly, that is, independently of the load.

Reference character U is an environmental influence factor in which the ambient pressure and the intake air temperature are included. This factor U also fluctuates between the values 0 and 1 and lies at standardized extreme ambient conditions at the value 1.

With this input of the driver command torque, an excellent metering of the torque in the region of large driver command values is reached in correspondence to the procedure in the above-mentioned state of the art.

With a third accelerator pedal range, a good meterability of the torque is made possible also in the drag range, especially for large drag torques, for example, during the recuperation of a starter generator. This idle-near range is described by an equation, which is built up as follows:

$$mfa_u=S_U*F+b_U$$

$$\text{wherein: } S_U=(Y+L)/X \text{ and } b_U=-L.$$

The selection of the reference point (X, Y) is free; however, this reference point must lie above the line $\mathrm{mfa}_m$ for the mid range. This third equation offers the possibility to suitably consider ancillary loads and drag torques via the selection of the reference point. The good meterability is also ensured in this range. For a driver command 0, a driver desired torque is adjusted, which corresponds to the negative load factor. In this way, it is ensured that the drive unit outputs a negative torque (overrun operation) at its output and thereby generates a large drag torque. For driver command values with the value greater than zero, however, still in the lower range, a lower drag torque is generated by the engine in the realization of the driver command because the (negative) driver command torque is less.

As an alternative for this third range, a linear equation having a predetermined slope can be provided.

The above-described embodiment computes the driver command torque on the basis of linear equations. In other embodiments, another realization (for example, by means of pregiven characteristic fields) is suitable. What is essential is that in the first, that is, the lower driver command range, and in a third, that is, the upper driver command range, engine loads are considered in the determination of the driver command torque; whereas, in the second, the mid driver command range, the driver command torque is considered independently of the changing ancillary loads.

Figure 2:
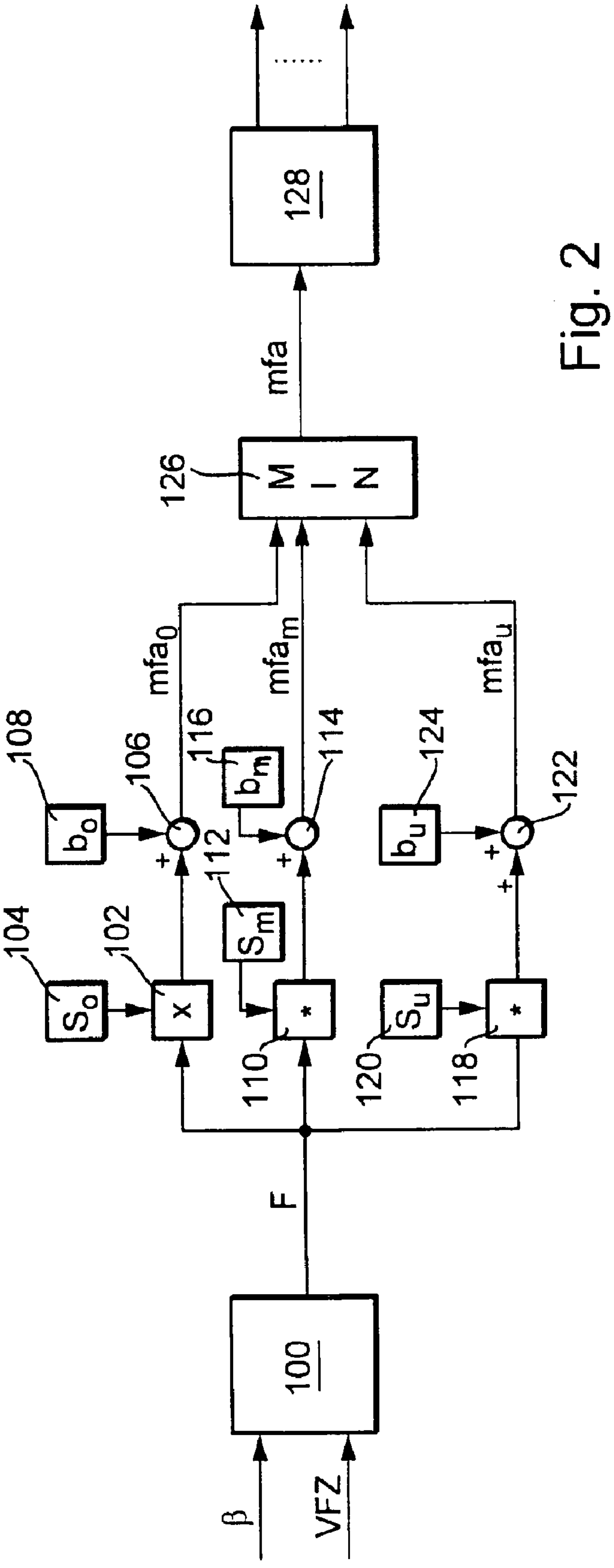
FIG. 2 is a sequence diagram showing a preferred procedure for determining the driver command torque.

In the preferred embodiment, the realization of the driver command detection is provided as a computer program of the microcomputer 12 of the control unit 10. An example for such a computer program is shown in FIG. 2 with respect to a sequence diagram. The individual blocks define programs, program parts or program steps with the described function, while the connecting lines represent the flow of information.

In a characteristic field 100, the relative driver command F is formed in dependence upon the accelerator pedal position β and, if required, the vehicle speed VFZ. The relative driver command moves between 0% for a released pedal and 100% for a completely actuated pedal. In a preferred embodiment, the driver command is standardized between a minimum torque and a maximum torque. The driver command torque represents a transmission output end torque, for example, a wheel torque, which is then converted into an engine torque in the course of the computations for converting the desired value into control variables for the drive unit. The engine torque can, for example, be an inner engine torque. The driver command value is supplied to a multiplier stage 102 wherein it is multiplied by the slope value $S_o$, which is determined in block 104 as, for example, described above. The product is added to the axis segment $b_o$ in the logic element 106 and, in this way, the driver command torque $mfa_o$ is formed for the upper driver command range. The axis segment value $b_o$ is computed in block 108, for example, as described above. In the same manner, the driver command value is multiplied in a multiplier stage 110 by the slope $S_m$ of the mid driver command range. The slope $S_m$ is formed in block 112, for example, as explained above. The product and the axis segment $b_m$ are added in the logic element 114. The axis segment $b_m$ is formed in block 116, for example, as indicated above. The result is the driver command torque $mfa_m$ for the mid driver command range. In addition, the driver command value F is multiplied in multiplier stage 118 by the slope value $S_u$ for the lower driver command range. The slope value $S_u$ is computed in block 120, for example, as indicated above. The product is then added in the logic element 122 to the axis segment value $b_u$ and, in this way, the driver command torque $mfa_u$ is computed for the lower range. The axis segment value $b_u$ is formed in block 124, for example, as indicated above. The three driver command torques are supplied to a minimum value selection stage 126. The smallest of the three supplied values is further processed in 128 as driver command torque mfa. This further processing is known from the state of the art and is therefore not described in greater detail. The driver command torque is formed by means of transmission ratios, which are present in the drive train, the inner losses and the torque requirement, which is not available for propulsion, to form an inner (indicated) engine torque. The result of this conversion in block 128 is actuating signals for controlling power parameters of the drive unit (in the case of an internal combustion engine, for adjusting the air supply, the fuel metering and/or the ignition angle).

In the computation of the driver command torques for the different driver command ranges, the above described equations are used in a preferred embodiment. In other embodiments, the equations are adapted, for example, the factor U and/or the factor K can be omitted. Other load dependencies on slope and axis segment are likewise conceivable. What is essential is that the driver command range is subdivided into at least three ranges wherein driver command torque values are determined with different weighting of the load dependency. These driver command torques are then coupled to a resulting driver command torque preferably in the context of a minimum value selection.

In the mid driver command range, an adjustment of the torque wanted by the driver is obtained which is independent of changing ancillary loads; whereas, in the lower and upper driver command ranges, good meterability of the driving torque by the operator is achieved.

Figure 3:
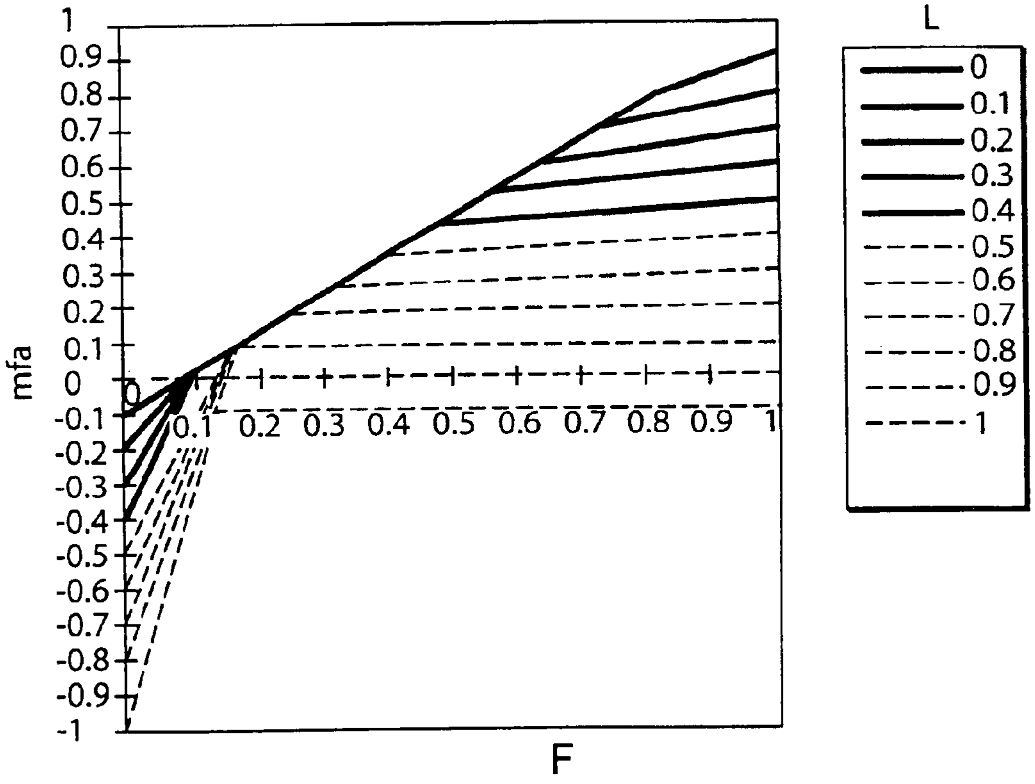
FIG. 3 shows exemplary characteristic lines wherein the driver command torque is plotted as a function of the relative driver command; and, FIG. 4 shows exemplary characteristic lines wherein the motor total torque is plotted as a function of the relative driver command.
Figure 4:
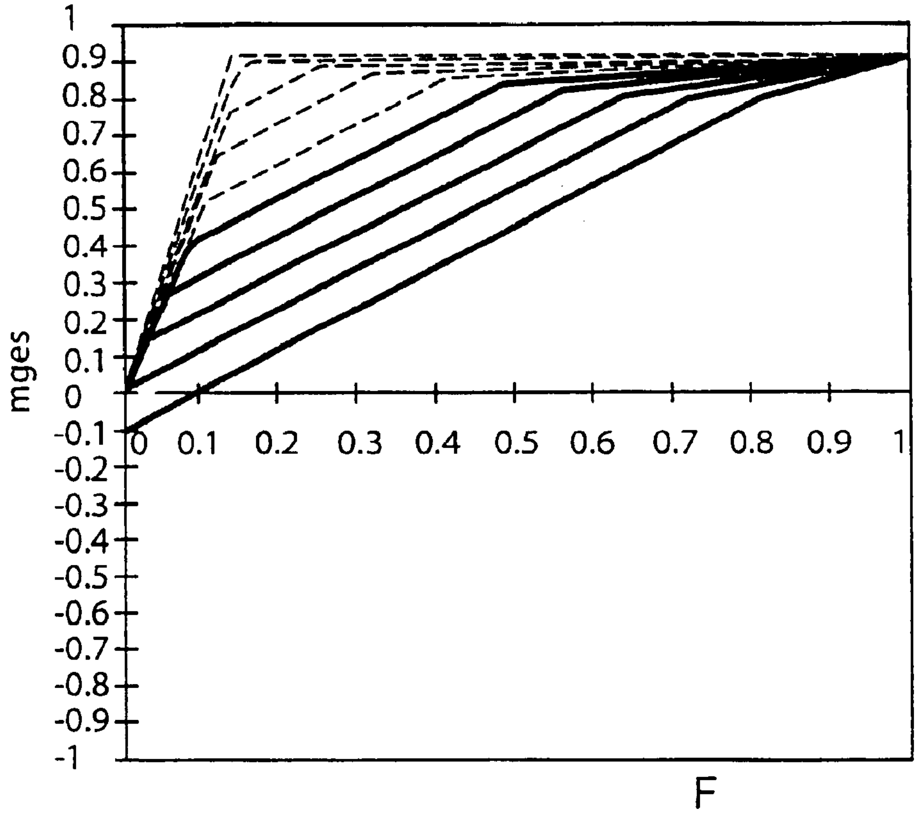

FIGS. 3 and 4 are diagrams which show the driver command torque mfa plotted as a function of the relative driver command F as well as a plot of the engine total torque mges as a function of the relative driver command F. The following numerical examples are used. The factor U is 0.9 and the factor K is 0.85. The slope for the mid portion is 1.1 and the axis segment therefor is –0.1. The reference point X is 0.3 and Y is 1.

FIG. 3 shows the driver command torque mfa, which is normalized to the maximum torque, plotted as a function of driver command value F, which essentially corresponds to the accelerator pedal position. The parameter of the family of curves shown is the factor L, that is, the ancillary loads which are present. It is shown here that, for load factors in the range of 0 to 0.3, a characteristic line arises which results in good meterability in the region of small and large driver command values as well as a load-independent adjustment within a mid range.

Correspondingly, the illustration of the engine total torque, which is standardized to the maximum torque, as a function of the driver command, shows a load-independent output or generation of torque with available meterability in the lower and upper driver command ranges.

As shown above, the procedure according to the invention can be used not only in combination with the control of internal combustion engines, but also with other drive concepts such as electric motors for determining the driver command.

It is understood that the foregoing description is that of the preferred embodiments of the invention and that various changes and modifications may be made thereto without departing from the spirit and scope of the invention as defined in the appended claims.

What is claimed is:

1. A method for controlling a drive unit of a vehicle wherein a driver command is determined from the degree of actuation of an operator-controlled element actuable by the driver, and wherein a desired value for the torque of said drive unit is formed from said driver command and the torque of said drive unit is controlled in dependence upon said desired value, the driver command being subdivided into first, second and third ranges, the method comprising the steps of:

causing said first range to include a zero value of said driver command and forming said desired value for the torque of said drive unit in said first range from the driver command value while considering changing ancillary loads of said drive unit;

forming said desired value for the torque of said drive unit from the driver command value in said second range independently of changing ancillary loads of said drive unit; and, causing said third range to include a maximum value of said driver command and forming said desired value for the torque of said drive unit from the driver command value in said third range while again considering said changing ancillary loads of said drive unit.

2. The method of claim 1, wherein said desired value is an engine output torque or a transmission output torque.

3. The method of claim 1, wherein said desired value is determined utilizing linear equations having respective slopes and axis sections determined differently; and, the minimum value of the results of the linear equation is the resulting desired value for each driver command value.

4. An arrangement for controlling a drive unit of a vehicle, the arrangement comprising:

an electronic control unit including means for determining a driver command from the degree of actuation of an operator-controlled element actuable by the driver; means for forming a desired value for the torque of said drive unit from said driver command; and, means for controlling the torque of said drive unit in dependence upon said desired value;

said driver command being subdivided into first, second and third ranges with said first range including the zero value of said driver command value and said third range including the maximum value of said driver command;

said forming means functioning to form said desired value of the torque of said drive unit in said first range from the driver command value while considering changing ancillary loads of said driver unit;

said forming means functioning to form said desired value in said second range from said driver command value independently of said changing ancillary loads of said drive unit; and, said forming means including means functioning to form said desired value from the driver command value while again considering said changing ancillary loads of said drive unit.

5. A computer program comprising program code means for carrying out the steps of a method when said program is run on a computer and said method being for controlling a drive unit of a vehicle wherein a driver command is determined from the degree of actuation of an operator-controlled element actuable by the driver, and wherein a desired value for the torque of said drive unit is formed from said driver command and the torque of said drive unit is controlled in dependence upon said desired value, the driver command being subdivided into first, second and third ranges, the method comprising the steps of:

causing said first range to include a zero value of said driver command and forming said desired value for the torque of said drive unit in said first range from the driver command value while considering changing ancillary loads of said drive unit;

forming said desired value for the torque of said drive unit from the driver command value in said second range independently of changing ancillary loads of said drive unit; and, causing said third range to include a maximum value of said driver command and forming said desired value for the torque of said drive unit from the driver command value in said third range while again considering said changing ancillary loads of said drive unit.

6. A computer program product comprising: program code means stored on a computer-readable data carrier in order to carry out a method for controlling a drive unit of a vehicle wherein a driver command is determined from the degree of actuation of an operator-controlled element actuable by the driver, and wherein a desired value for the torque of said drive unit is formed from said driver command and the torque of said drive unit is controlled in dependence upon said desired value, the driver command being subdivided into first, second and third ranges, the method comprising the steps of:

causing said first range to include a zero value of said driver command and forming said desired value for the torque of said drive unit in said first range from the driver command value while considering changing ancillary loads of said drive unit;

forming said desired value for the torque of said drive unit from the driver command value in said second range independently of changing ancillary loads of said drive unit; and, causing said third range to include a maximum value of said driver command and forming said desired value for the torque of said drive unit from the driver command value in said third range while again considering said changing ancillary loads of said drive unit.

* * * * *